United States Patent
Morhart et al.

(10) Patent No.: US 11,491,926 B2
(45) Date of Patent: Nov. 8, 2022

(54) WIRING HARNESS FOR AN AIRBAG MODULE OF A VEHICLE OCCUPANT SAFETY SYSTEM, AIRBAG MODULE, VEHICLE CABLING AND VEHICLE OCCUPANT SAFETY SYSTEM HAVING A WIRING HARNESS OF THIS KIND AND A METHOD OF PRODUCTION

(71) Applicant: TRW AUTOMOTIVE SAFETY SYSTEMS GMBH, Aschaffenburg (DE)

(72) Inventors: Johannes Morhart, Großostheim (DE); Marco Tumminello, Niedernberg (DE); Joao Ribeiro, Babenhausen (DE); Stefan Bachmann, Heimbuchenthal (DE); Alexander Bott, Mainaschaff (DE); Bernd Stransfeld, Großwallstadt (DE); Andreas Fleckenstein, Habichtsthal (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 788 days.

(21) Appl. No.: 16/346,889

(22) PCT Filed: Oct. 24, 2017

(86) PCT No.: PCT/EP2017/077145
§ 371 (c)(1),
(2) Date: May 2, 2019

(87) PCT Pub. No.: WO2018/082968
PCT Pub. Date: May 11, 2018

(65) Prior Publication Data
US 2020/0189496 A1 Jun. 18, 2020

(30) Foreign Application Priority Data

Nov. 3, 2016 (DE) .......................... 102016120988.0

(51) Int. Cl.
*H01R 33/00* (2006.01)
*B60R 16/02* (2006.01)
(Continued)

(52) U.S. Cl.
CPC ........ *B60R 16/0215* (2013.01); *B60R 16/027* (2013.01); *B60R 16/0207* (2013.01);
(Continued)

(58) Field of Classification Search
CPC ............ B60R 16/0215; B60R 16/0207; B60R 16/027; B60R 2021/26029; B60R 21/26; B60R 21/264; F15B 15/19; B62D 65/02
(Continued)

(56) References Cited

U.S. PATENT DOCUMENTS 5,428,535 A * 6/1995 Katsumata ........... H05K 7/1477
361/641
5,592,356 A * 1/1997 Ryl ....................... F02M 51/005
361/210
(Continued)

FOREIGN PATENT DOCUMENTS

DE 102007024749 11/2008
DE 102009057895 6/2011
(Continued)

*Primary Examiner* — Abdullah A Riyami
*Assistant Examiner* — Vladimir Imas
(74) *Attorney, Agent, or Firm* — Tarolli, Sundheim, Covell & Tummino LLP

(57) ABSTRACT

The invention relates to a wiring harness (10) for an airbag module of a vehicle occupant safety system, particularly for a driver's airbag module, having a connector (11) for connecting to a pyrotechnic igniter of the airbag module, at least one module connecting cable (12) connected to the connec-
(Continued)

tor (11) for connecting the connector (11) to a vehicle wiring harness, and at least one actuator unit (13) having a pyrotechnic actuator (17) and an actuator connecting cable (14) which is formed integrally with the actuator unit (13) and is connected to the connector (11). The invention further relates to an airbag module, vehicle cabling and a vehicle occupant safety system having a wiring harness of this kind and to a method of production.

13 Claims, 2 Drawing Sheets

(51) Int. Cl.
  *B60R 16/027* (2006.01)
  *F15B 15/19* (2006.01)
  *B60R 21/26* (2011.01)
  *B60R 21/264* (2006.01)
  *B62D 65/02* (2006.01)

(52) U.S. Cl.
  CPC .............. *B60R 21/26* (2013.01); *F15B 15/19* (2013.01); *B60R 21/264* (2013.01); *B60R 2021/26029* (2013.01); *B62D 65/02* (2013.01)

(58) Field of Classification Search
  USPC .......................................................... 439/34
  See application file for complete search history.

(56) References Cited

U.S. PATENT DOCUMENTS

| | | | | |
|---|---|---|---|---|
| 5,685,617 | A * | 11/1997 | Hio | B60T 8/368 303/119.2 |
| 5,791,432 | A * | 8/1998 | Fushimi | B62D 7/1581 180/445 |
| 5,936,186 | A | 8/1999 | Wier | |
| 6,755,544 | B2 * | 6/2004 | Schnell | B60R 1/072 439/352 |
| 7,521,817 | B2 * | 4/2009 | Gors | B60R 21/017 337/415 |
| 7,980,591 | B2 * | 7/2011 | Schonhuber | F42B 3/006 280/737 |
| 8,863,665 | B2 * | 10/2014 | DeVries | F42C 19/12 102/206 |
| 9,124,020 | B2 * | 9/2015 | Kameda | H01R 13/6395 |
| 10,464,506 | B2 * | 11/2019 | Kiyosue | H02G 3/16 |
| 2004/0112239 | A1 | 6/2004 | Parks et al. | |
| 2007/0257557 | A1 | 11/2007 | Gors | |
| 2009/0167006 | A1 | 7/2009 | Schonhuber et al. | |
| 2009/0309342 | A1 | 12/2009 | Schonhuber | |
| 2013/0174755 | A1 | 7/2013 | De Vries et al. | |

FOREIGN PATENT DOCUMENTS

| | | |
|---|---|---|
| DE | 102014200936 | 7/2015 |
| WO | 2017093313 | 8/2017 |

* cited by examiner

WIRING HARNESS FOR AN AIRBAG MODULE OF A VEHICLE OCCUPANT SAFETY SYSTEM, AIRBAG MODULE, VEHICLE CABLING AND VEHICLE OCCUPANT SAFETY SYSTEM HAVING A WIRING HARNESS OF THIS KIND AND A METHOD OF PRODUCTION

RELATED APPLICATIONS

This application corresponds to PCT/EP2017/077145, filed Oct. 24, 2017, which claims the benefit of German Application No. 10 2016 120 988.0, filed Nov. 3, 2016, the subject matter of which are incorporated herein by reference in their entirety.

BACKGROUND OF THE INVENTION

The invention relates to a wiring harness for an airbag module of a vehicle occupant safety system comprising the features of claim 1. Furthermore, the invention relates to an airbag module, vehicle cabling and a vehicle occupant safety system having a wiring harness of this type. Finally, the invention deals with a method of production and a method of connecting an actuator to a vehicle wiring harness.

Up-to-date vehicles include a complex vehicle occupant safety system which comprises, inter alia, gas bag modules, so-called airbag modules. The airbag module usually comprises an inflator having a pyrotechnic igniter. The inflator is electrically connected to control components inside the vehicle. Concretely speaking, the pyrotechnic igniter is triggered by means of an electric pulse which is transmitted to the inflator via the appropriate control electronics.

In addition to airbag modules, the vehicle occupant safety system may include pyrotechnic actuators which may fulfil different functions. For example, pyrotechnic actuators are used for influencing the inflating behavior of an airbag. The airbag may include internal tethers which are cut where needed so as to provide a larger airbag volume or to enable the shape of the airbag to be adapted in due time. Said pyrotechnic actuators are also referred to as tether activation units.

The pyrotechnic actuators are likewise electrically coupled to the control electronics of the vehicle and receive an appropriate electric control pulse for releasing. The incorporation of a pyrotechnic actuator in the vehicle cabling is usually effectuated by a plug connection between the pyrotechnic actuator and a vehicle wiring harness. As an alternative, it is known from practice to electrically couple the pyrotechnic actuator to the associated airbag module by a plug connection. In pyrotechnic actuators which are assigned to a driver's airbag module, the pyrotechnic actuator is usually connected to the vehicle-side release control by a plug connection between the steering wheel wiring harness and the pyrotechnic actuator.

During vehicle assembly, this connection of the pyrotechnic actuator to the vehicle wiring harness entails increased assembly expenditure. On the one hand, during assembly the airbag module must be electrically connected to the vehicle wiring harness, such as the steering wheel wiring harness. Moreover, another electric connection has to be made between the pyrotechnic actuator and the vehicle wiring harness or the airbag module.

SUMMARY OF THE INVENTION

It is the object of the present invention to suggest a wiring harness that reduces the assembly expenditure for a vehicle occupant safety system. Moreover, it is the object of the invention to state an airbag module, vehicle cabling and a vehicle occupant safety system comprising a wiring harness of this type. It is a further object of the invention to state a method of producing a wiring harness and a method of electrically connecting an actuator to a vehicle wiring harness, which is accompanied by reduction of the assembly expenditure and the related costs.

This object is achieved by the present invention regarding the wiring harness by the subject matter of claim 1, regarding the airbag module by the subject matter of claim 8, regarding vehicle cabling by the subject matter of claim 9, regarding the vehicle occupant safety system by the subject matter of claim 11, regarding the method of production by the subject matter of claim 12 and regarding the method of electrically connecting an actuator to a vehicle wiring harness by the subject matter of claim 13. Preferred developments of the afore-mentioned solutions are stated in the respective subclaims.

Concretely, for achieving the afore-mentioned object the invention suggests a wiring harness for an airbag module of a vehicle occupant safety system, especially for a driver's airbag module, the wiring harness including a connector for connection to a pyrotechnic igniter of the airbag module, at least one module connecting cable connected to the connector for connecting the connector to the vehicle wiring harness and at least one actuator unit having a pyrotechnic actuator and an actuator connecting cable which is formed integrally with the actuator unit and is connected to the connector.

The basic idea of the present invention therefore consists in integrating the pyrotechnic actuator in the wiring harness of the airbag module. The actuator connecting cable insofar is preferably tightly connected to the connector, especially connected by latching or clamping. The module connecting cable may equally be tightly connected to the connector. Hence, in total a wiring harness is resulting which during assembly of the vehicle occupant safety system has to be connected, on the one hand, to the airbag module by the connector and, on the other hand, to the vehicle wiring harness, wherein at the same time the pyrotechnic actuator is incorporated in the vehicle occupant safety system.

In this way, a separate connection of the pyrotechnic actuator to the vehicle wiring harness, such as e.g. a steering wheel wiring harness, is superfluous. During assembly of the vehicle occupant safety system and, resp., of a vehicle, thus merely one single connection has to be established between the airbag module and the vehicle wiring harness. In this way, the connection of the module connecting cable to the airbag module and to the vehicle wiring harness helps to achieve both the airbag module and the pyrotechnic actuator to be electrically connected to the corresponding control systems of the vehicle occupant safety system.

Consequently, the invention helps to reduce the assembly effort, especially the assembling time, for a vehicle occupant safety system, which consequently results in a reduction of the production cost. The drop of an additional plug connection, as it is provided in prior art for connecting the pyrotechnic actuator to the airbag module or to the vehicle wiring harness, moreover reduces the space required for the actuator unit.

Plug connections frequently tend to emit noise due to vibrations in vehicles in which usually vibrations occur. The drop of an additional plug connection for connecting the pyrotechnic actuator to the vehicle wiring harness or to the airbag module thus reduces the risk of noise. Moreover, faulty cable positioning or resp., insufficient electric connection which may result in a restriction of the functioning of the vehicle occupant safety system is prevented. Hence the operating safety of the vehicle occupant safety system is increased on the whole. At the same time, the risk of complaint is reduced.

Concerning the wiring harness according to the invention, the actuator connecting cable is provided to be formed integrally with the actuator unit. In other words, the actuator connecting cable forms a unit with the pyrotechnic actuator, i.e. the actuator unit. The actuator connecting cable and the pyrotechnic actuator cannot be nondestructively separated from each other. In this respect, it is preferably provided that the actuator connecting cable is connected non-detachably, especially free from a connector, to the actuator.

The actuator connecting cable may include at least one strand having a free strand end in preferred configurations of the invention. The strand end may be provided with a plug member such as a strand end sleeve. The plug member, especially the strand end sleeve, preferably extends into a slot of the connector. Concretely speaking, the strand end can be tightly anchored in a slot of the connector. The use of a plug member for connecting the strand to a connector increases flexibility and facilitates production of the wiring harness. Especially, during production of the wiring harness the strand can be coupled to any connectors in a simple manner and with little time expenditure. Depending on the requirement, different connectors, for example having a different number of slots, can be used. In the running production process this can be easily modified depending on customer requests without having to adapt the time involved for the mounting step of connecting the connector to the strand. This is advantageous for efficient and low-cost series production.

In general, the actuator connecting cable may be provided to have two strands. Each of the two strands may be fixed with a slot of the connector, for example via a plug member provided at each strand end. Of preference, it is provided that the two strands are wrapped, at least in portions, with an insulating tube. It is not excluded that further strands are arranged within the insulating tube. Wrapping of the strands with an insulating tube facilitates handling of the wiring harness, improves electric insulation of the actuator connecting cable and protects the strands from damage.

In preferred embodiments, the insulting tube may be tightly connected, especially connected by clamping, to the housing of the actuator. This prevents the insulating tube from being movable along the strands, which otherwise might result in strands being exposed at locations which have an increased risk of damage. The insulating tube tightly connected to the housing of the actuator, on the other hand, retains its position and thus ensures protection for the strands in the portion of the actuator unit provided by the manufacturer.

As regards the module connecting cable of the wiring harness according to the invention, said module connecting cable is preferably provided to have at least one connector for electric connection to the vehicle wiring harness at a vehicle-side cable end. The module connecting cable may equally include two or more strands at each of the vehicle-side ends of which a connector is provided. The connector may be plug-connectable to a complementary connecting element. It is also possible that the module connecting cable has merely one single connector into which all strands of the module connecting cable end so that merely one single plug connection has to be established for connection to the vehicle wiring harness.

According to an independent aspect, the invention is based on the idea to state an airbag module having an afore-described wiring harness. Especially, the airbag module and the wiring harness may be distributed as a uniform packing unit. Accordingly, the wiring harness may be already pre-connected to the connector at the airbag module.

Another aspect of the invention relates to vehicle cabling by an afore-described wiring harness and/or an afore-described airbag module. For the vehicle cabling according to the invention the wiring harness, especially the module connecting cable, may be provided to be electrically connected to a vehicle wiring harness, especially a steering wheel wiring harness.

Within the scope of the present application, there is moreover disclosed and claimed a vehicle occupant safety system which includes a wiring harness described herein and/or an airbag module described herein and/or vehicle cabling described herein.

Another aspect of the invention relates to a method of producing an afore-described wiring harness, the method comprising the following steps of:
providing an actuator unit having an integrated actuator connecting cable, a module connecting cable and a connector; and
connecting the module connecting cable and the actuator cable to the connector.

It is evident that the suggested method of production significantly facilitates the production of said wiring harness. In particular, the actuator unit comprising the actuator connecting cable as an integral component already helps to avoid additional mounting steps during production of the wiring harness. In this respect, it is not necessary to provide an additional connector at the actuator unit for connecting the actuator unit to the wiring harness of the airbag module. Rather, the module connecting cable and the actuator unit share a connector. Thus, the material costs for the wiring harness are reduced, which is simultaneously accompanied by weight reduction.

The present invention moreover suggests a method of electrically connecting an actuator to a vehicle wiring harness, especially a steering wheel wiring harness, wherein the following steps are carried out in the method:
providing an afore-described wiring harness, especially a wiring harness having an integrated pyrotechnic actuator; and
connecting the module connecting cable to the vehicle wiring harness and/or to an airbag module.

In the method according to the invention for electric connection of an actuator to a vehicle wiring harness, preferred variants provide that exclusively the afore-described steps are carried out. In particular, further steps such as e.g. an additional plug connection between the pyrotechnic actuator and a vehicle wiring harness or between the actuator and a wiring harness of the airbag module can be dispensed with. Rather, by the steps of connecting the module connecting cable to the vehicle wiring harness, especially by means of the at least one connector and a complementary connecting element at the vehicle wiring harness, the airbag module and the pyrotechnic actuator are simultaneously connected to the vehicle wiring harness. The advantage of the invention becomes evident even if the wiring harness is already connected to the vehicle wiring harness on the vehicle side. Then an electric connection of the pyrotechnic igniter to the vehicle wiring harness can be simultaneously effectuated via a sole plug connection, viz. between the connector and the airbag module.

In general, for the comprehension of the present invention it is pointed out that the connector of the wiring harness may be both a plug member and a socket member. The term "connector" generally denotes connecting elements which can be plug-connected to an appropriately complementary counter-element, wherein one of the plug-connectable parts forms the plug member and the other plug-connectable part forms the socket member.

BRIEF DESCRIPTION OF THE DRAWINGS

Hereinafter, the invention will be illustrated in detail by way of an example embodiment with reference to the enclosed schematic drawings, wherein.

DESCRIPTION

Figure 1:
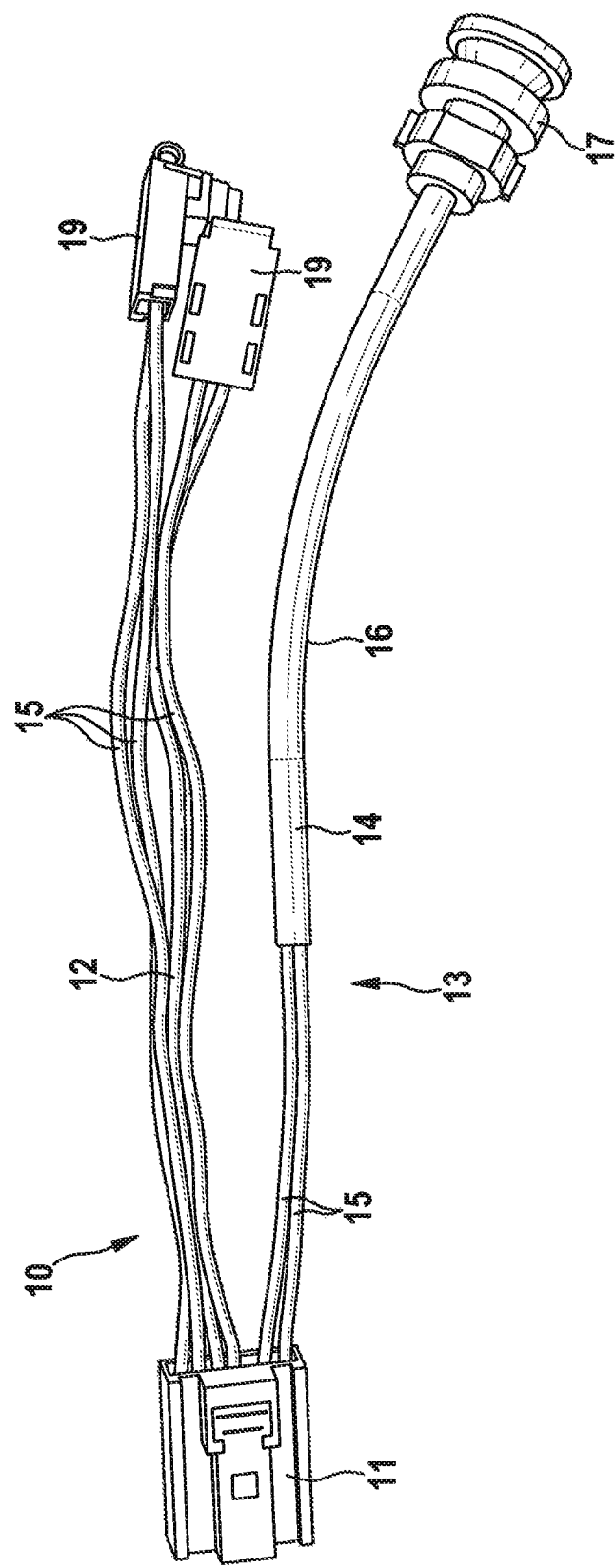
FIG. 1 shows a top view onto a wiring harness according to the invention as set forth in a preferred example embodiment.

The wiring harness 10 shown in the Figures comprises a connector 11 in which a module connecting cable 12 and an actuator connecting cable 14 end. The wiring harness 10 especially comprises the module connecting cable 12 by which the wiring harness 10 is connectable to an airbag module of a vehicle occupant safety system. For this purpose, the module connecting cable 12 has strands 15 ending with their strand ends in the connector 11, especially in slots of the connector 11. The strands 15 are tightly connected to the connector 11.

At the strand end opposed to the connector 11, each of the strands 15 of the module connecting cable 12 is connected to a connector 18. Accordingly, the shown example embodiment provides that two strands 15 at a time end in one connector 18. The connectors 18 enable the wiring harness 10 to be connected to a vehicle wiring harness. To this end, the connectors 18 may be plug-connectable especially to a complementary connecting element of the vehicle wiring harness.

Figure 2:
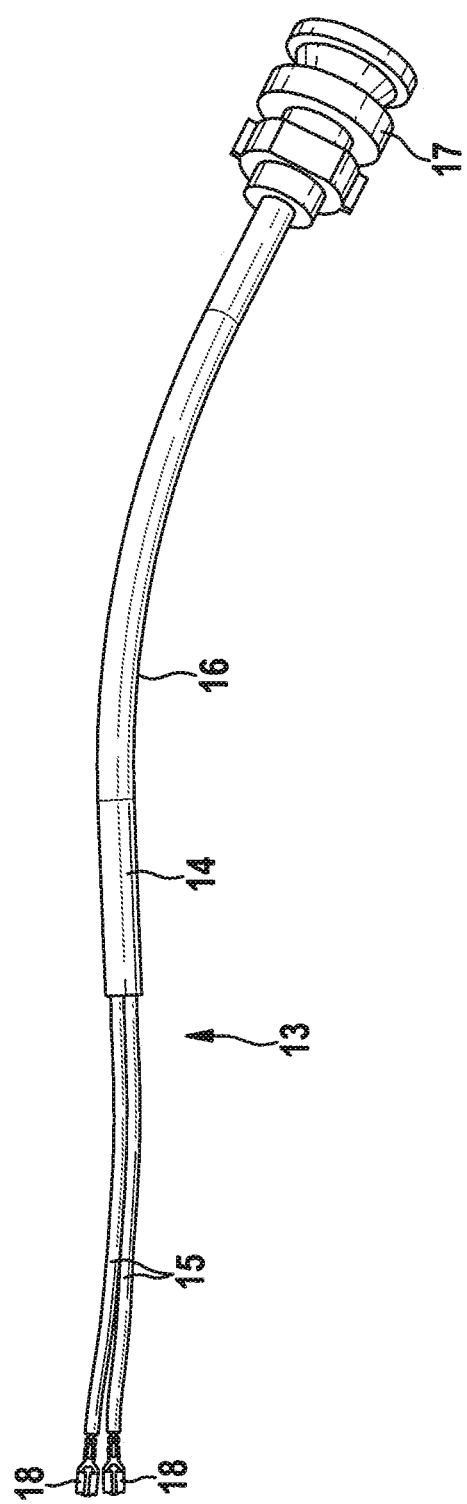
FIG. 2 shows a detail view of the actuator unit of the wiring harness according to FIG. 1.

Furthermore, an integral part of the wiring harness 10 is an actuator unit 13 shown in detail in FIG. 2. The actuator unit 13 comprises a pyrotechnic actuator 17. The pyrotechnic actuator 17 may form a tether-activation-unit, for example. In this respect, the pyrotechnic actuator 17 may be used, for example, for severing a tether of an airbag. The pyrotechnic actuator 17 may also have other functions. For example, the actuator 17 may be used as a hood prop for passive pedestrian protection. It is also imaginable to design the actuator 17 as part of a belt tensioning mechanism.

Further, the actuator unit 13 comprises the actuator connecting cable 14 formed integrally with the actuator unit 13. Concretely speaking, the actuator connecting cable 14 is tightly connected to the pyrotechnic actuator 17. The connection between the actuator connecting cable 14 and the actuator 17 especially cannot be nondestructively released. In this respect, the actuator unit 13 is designed to be generally free from connectors.

The actuator connecting cable 14 comprises two strands 15 which at least in portions are arranged within an insulating tube 16. The insulating tube 16 is connected to the actuator 17. In particular, the insulating tube 16 may be tightly connected by clamping to be actuator 17. It is clearly visible from FIG. 2 that the strands 15 project from the insulating tube 16 and are exposed at least in portions. The strands 15 have an internal electrically conducting wire and, resp., an internal electrically conducting wire bundle which is sheathed by an insulation. The insulating tube 16 at least in portions forms an additional insulation. The insulating tube 16 may be formed as a shrink tube or circular crimp tube for this purpose.

Each of the free strand ends of the strands 15 of the actuator connecting cable 14 is provided with a plug member 18. The plug member 18 may be especially in the form of a cable terminal which is connected by crimping to the exposed wires of the strand 15. The plug member 18 serves for connecting the actuator unit 13 to the joint connector 11. Connection of the plug member 18 to the connector is usually carried out during production of the wiring harness 10 and forms a tight connection. Especially, the plug member 18 is preferably locked with the connector so that inadvertent release of the plug member 18 is prevented.

For producing the wiring harness 10 the actuator unit 13 is preferably provided as a uniform subassembly. Furthermore, the module connecting cable including the connector 11 and the connectors 19 is preferably provided as a uniform subassembly. In this respect, especially for final assembly of the wiring harness 10 merely the actuator unit 13 including the integrated actuator connecting cable 14 and the module connecting cable 12 is provided, with the module connecting cable 12 being already tightly connected to the connector 11, wherein the module connecting cable 12 does not occupy all slots of the connector 11.

Therefore, during final assembly merely the plug members 18 have to be inserted into and tightly anchored in the remaining slots of the connector 11. For this purpose, the connector 11 may include a cable locking which prevents the module connecting cable 12 and/or the actuator connecting cable 14 from being disconnected.

LIST OF REFERENCE NUMERALS 1 wiring harness
11 connector
12 module connecting cable
13 actuator unit
14 actuator connecting cable
15 strand
16 insulating tube
17 actuator
18 plug member
19 connector

The invention claimed is:

1. A wiring harness for an airbag module of a vehicle occupant safety system, especially for a driver's airbag module, comprising:
    a connector for connection to a pyrotechnic igniter of the airbag module,
    at least one module connecting cable connected to the connector for connecting the connector to a vehicle wiring harness, and
    at least one actuator unit comprising a pyrotechnic actuator and an electrical actuator connecting cable which is formed integrally with the actuator unit and is connected to the connector.

2. The wiring harness according to claim 1, wherein the actuator connecting cable is connected to the actuator nondetachably, especially free from connectors.

3. The wiring harness according to claim 1, wherein the actuator connecting cable has at least one strand with a free strand end, the strand end being provided with a plug member, especially a strand end sleeve, extending into a slot of the connector.

4. The wiring harness according to claim 1, wherein the actuator connecting cable comprises two strands which are wrapped at least in portions with an insulating tube.

5. The wiring harness according to claim 4, wherein the insulating tube is tightly connected, especially connected by clamping, to a housing of the actuator.

6. The wiring harness according to claim 1, wherein the module connecting cable includes at least one connector for electric connection to the vehicle wiring harness at a vehicle-side cable end.

7. The wiring harness according to claim 6, wherein the connector can be plug-connected to a complementary connecting element of the vehicle wiring harness.

8. An airbag module comprising a wiring harness according to claim 1.

9. Vehicle cabling comprising a wiring harness and/or an airbag module according to claim 1.

10. The vehicle cabling according to claim 9, wherein the wiring harness, especially the module connecting cable, is electrically connected to a vehicle wiring harness, especially to a steering wheel wiring harness.

11. A vehicle occupant safety system comprising a wiring harness and/or an airbag module and/or vehicle cabling according to claim 1.

12. A method of producing a wiring harness according to claim 1, comprising the following steps of:
 providing an actuator unit having an integrated actuator connecting cable, a module connecting cable and a connector; and
 connecting the module connecting cable and the actuator connecting cable to the connector.

13. A method of electrically connecting an actuator to a vehicle wiring harness, especially to a steering wheel wiring harness, comprising, especially exclusively, the following steps of:
 providing a wiring harness according to claim 1; and
 connecting the module connecting cable to the vehicle wiring harness.

\* \* \* \* \*